United States Patent
Shimonishi et al.

(10) Patent No.: US 11,316,215 B2
(45) Date of Patent: Apr. 26, 2022

(54) BATTERY STRUCTURE REDUCING LITHIUM DEPOSITION

(71) Applicant: DENSO CORPORATION, Kariya (JP)

(72) Inventors: Yuta Shimonishi, Kariya (JP); Shuhei Yoshida, Kariya (JP); Daisuke Shibata, Kariya (JP); Hiroyoshi Yamamoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 293 days.

(21) Appl. No.: 16/785,982

(22) Filed: Feb. 10, 2020

(65) Prior Publication Data

US 2020/0259224 A1    Aug. 13, 2020

(30) Foreign Application Priority Data

Feb. 8, 2019 (JP) .............................. JP2019-021657

(51) Int. Cl.

| H01M 10/613 | (2014.01) |
| H01M 10/617 | (2014.01) |
| H01M 10/6557 | (2014.01) |
| H01M 10/0525 | (2010.01) |
| H01M 10/647 | (2014.01) |
| H01M 50/20 | (2021.01) |

(52) U.S. Cl.
CPC ..... *H01M 10/613* (2015.04); *H01M 10/0525* (2013.01); *H01M 10/617* (2015.04); *H01M 10/647* (2015.04); *H01M 10/6557* (2015.04); *H01M 50/20* (2021.01)

(58) Field of Classification Search
CPC ........... H01M 10/613; H01M 10/0525; H01M 10/617; H01M 10/647; H01M 10/6557; H01M 50/20; H01M 10/625; H01M 10/54; H01M 10/6554; H01M 10/6556; Y02W 30/84; Y02E 60/10
USPC ........................................................ 429/120
See application file for complete search history.

(56) References Cited

U.S. PATENT DOCUMENTS

2007/0026316 A1\* 2/2007 Imachi .................. H01M 4/525
                                                                    429/232
2014/0038009 A1\* 2/2014 Okawa .............. H02J 7/007192
                                                                    429/62

FOREIGN PATENT DOCUMENTS

JP         2012-064357 A     3/2012
JP              5401900 B2    1/2014

\* cited by examiner

*Primary Examiner* — Gary D Harris
(74) *Attorney, Agent, or Firm* — Oliff PLC

(57) ABSTRACT

A battery structure includes a plurality of batteries each made of lithium-ion secondary battery; and a plurality of arrangement portions in which the plurality of batteries are arranged. The plurality of arrangement portions are divided into two groups of: a upper heat transfer group having heat transfer orders higher than a center value of the heat transfer orders, where the heat transfer orders are respective amount of heat transfer from the batteries being ranked in descending order; and a lower heat transfer group having the heat transfer orders lower than the center value. A battery among the plurality of batteries showing the highest value of a lithium deposition tolerance which represents a degree of lithium being unlikely to deposit during charge/discharge operation, is disposed in a high tolerance arrangement portion in the plurality of arrangement portions, the high tolerance arrangement portion belonging to the upper heat transfer group.

7 Claims, 6 Drawing Sheets

BATTERY STRUCTURE REDUCING LITHIUM DEPOSITION

CROSS-REFERENCE TO RELATED APPLICATION

This application is based on and claims the benefit of priority from earlier Japanese Patent Application No. 2019-21657 filed Feb. 8, 2019, the description of which is incorporated herein by reference.

BACKGROUND

Technical Field

The present disclosure relates to a battery structure.

Description of the Related Art

Conventionally, a battery module or a battery pack which include a plurality of battery cells have been widely used. For example, Japanese Patent Number 5401900 discloses a configuration of a battery module in which a plurality of battery cells are arranged in a casing and restrained by a restraining member at the both ends thereof. In the battery module, a heating portion is provided between the battery cells and the restraining member. According to the configuration, a warming-up means heats the heating portion, thereby heating the battery cells located adjacently to the restraining member to prevent the restraining member from transferring heat of the battery cells. Hence, entire battery cells can be efficiently warmed-up.

SUMMARY

The present disclosure has been achieved in light of the above-described circumstances, and provides a battery structure that prevents lithium from being deposited.

A first aspect of the present disclosure is a battery structure including: a plurality of batteries each made of lithium-ion secondary battery; and a plurality of arrangement portions in which the plurality of batteries are arranged.

DETAILED DESCRIPTION OF THE PREFERRED EMBODIMENTS

In addition to the above-described patent literature, as a conventional art, a cooling apparatus has been utilized to forcibly cool the battery cells or the battery module, in order to suppress excess heat produced by the battery cells or the battery module when driving or performing rapid charging. In this case, there is a concern that the plurality of battery cells or the battery module are not uniformly cooled such that the battery cells located close to the cooling apparatus or the battery cells located at a position where the heat is significantly transferred are excessively cooled. In the case where the battery cells or the battery module are made of lithium-ion secondary batteries, and if they are excessively cooled, lithium may be deposited on the electrodes, which causes degradation of charge-discharge efficiency or safety.

The present disclosure has been accomplished in light of the above-described circumstances and provides a battery structure that prevents lithium from being deposited. The battery structure is embodied in various manners in the embodiments as described below.

First Embodiment

Figure 1:
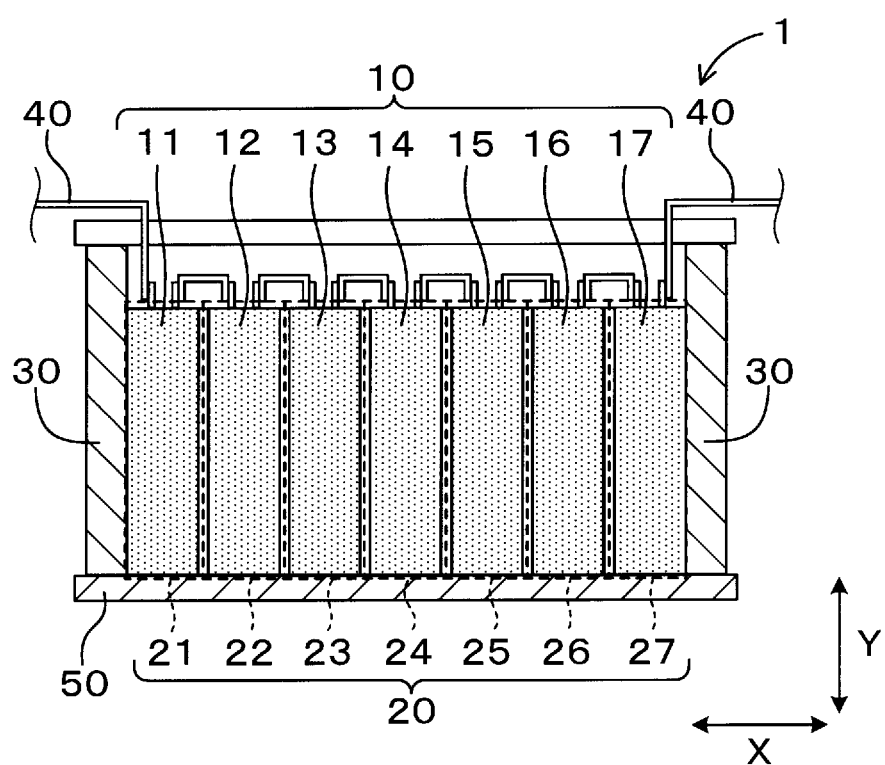
FIG. 1 is a conceptual diagram showing a configuration of a battery structure according to a first embodiment of the present disclosure.
Figure 2:
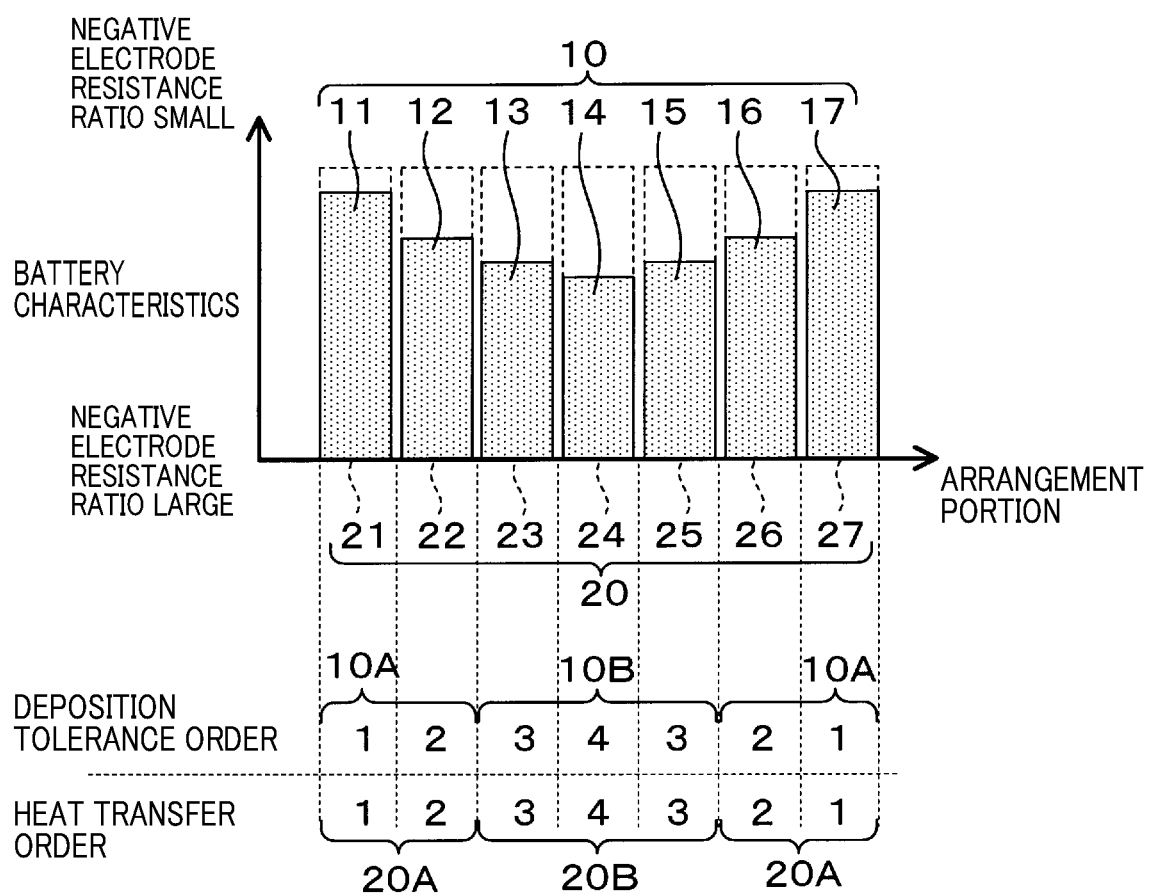
FIG. 2 is a conceptual diagram showing a relationship between a deposition tolerance order and a heat transfer order according to the first embodiment.

With reference to FIGS. 1 and 2, embodiments of the above-described battery structure will be described.

As shown in FIG. 1, a battery structure 1 according to the present embodiment includes a plurality of batteries 10 each made of a lithium-ion secondary battery, and a plurality of arrangement portions 20 in which the batteries 10 are arranged. As shown in FIG. 2, the plurality of arrangement portions 20 are divided into an upper heat transfer group 20A having heat transfer orders higher than the center value of the heat transfer orders, where the heat transfer orders are respective amounts of heat transfer from the batteries 10 being ranked in descending order, and a lower heat transfer group 20B having heat transfer orders lower than the center value of the heat transfer orders. Among the plurality of batteries 10, a battery 10 showing the highest value of the lithium deposition tolerance which represents a degree of lithium being unlikely to deposit during charge/discharge operation, is disposed in an arrangement portion, in the plurality of arrangement portions 20, belonging to the upper heat transfer group 20A.

Hereinafter, the battery structure 1 according to the first embodiment will be described. The battery structure 1 may constitute a battery module or a battery pack. According to the present embodiment, the battery structure 1 is a battery module including a battery cell which is a single battery as the battery 10. The battery 10 may be configured as a battery assembly having a plurality of battery cells. In the case where the battery cell 10 is a battery assembly, whole battery cells which constitute the battery assembly can be regarded as a single battery 10. Note that the battery structure 1 is configured as a battery pack, the battery structure 1 may be provided with a battery module as the battery 10.

The battery 10 is made of a publicly known lithium-ion secondary battery. The configuration of the lithium-ion secondary battery is not specifically limited, but may be a so-called bipolar type solid state battery in which the electrolyte is made of a solid body. For the electrode material, publicly known material can be employed. According to the present embodiment, the plurality of batteries 10 are each made of lithium-ion secondary battery as a single battery in which the electrolyte is a liquid. As shown in FIG. 1, the plurality of batteries 10 includes a first battery 11, a second battery 12, a third battery 13, a fourth battery 14, a fifth battery 15, a sixth battery 16 and a seventh battery 17. The respective batteries 11 to 17 are connected in series with each other. Note that the number of batteries 10 included in the plurality of batteries 10 is not limited.

As shown in FIG. 2, the battery characteristics of the plurality of batteries 10 has variation at the time of the initial shipment. The variation is caused by various factors in the elements that constitute the batteries 10. However, the variation may be reduced by changing conditions such as temperature, time, and application voltage in the manufacturing processes of the batteries 10. As one of the battery characteristics, there is the lithium deposition tolerance. The lithium deposition tolerance is an index representing a degree of lithium being unlikely to deposit during charge/discharge operation, which can be defined based on at least one of a ratio of the resistance at the negative electrode to the battery resistance of the batteries 10, a capacity ratio between the positive electrode and the negative electrode which is a ratio of the positive electrode capacity to the negative electrode capacity of the batteries 10, low temperature characteristics of the batteries 10, and the thermal capacity of the batteries 10. For example, a ratio of the negative electrode resistance to the battery resistance is calculated for each battery 10, then the lithium deposition tolerance can be defined such that the smaller the ratio, the higher the lithium deposition tolerance is. In the plurality of batteries 10, the ratio of the negative electrode resistance to the battery resistance can be obtained, for example, by estimating the negative electrode resistance based on the resistance calculated using a voltage change during the operation of the battery 10, by calculating the negative electrode resistance obtained based on the AC impedance during operation. The ratio of the negative electrode resistance to the battery resistance can be controlled using, for example, an electrode weight ratio between the positive electrode and the negative electrode, and a type of active material of the positive and negative electrodes.

In the case where the lithium deposition tolerance is defined based on the positive-negative capacity ratio of the respective batteries 10, information obtained in the manufacturing test such as weight of the positive/negative electrodes, the battery capacity, the battery voltage, and the battery resistance are calculated to define the lithium deposition tolerance such that the larger the capacity ratio, the higher the lithium deposition tolerance is. Also, the lithium deposition tolerance is defined based on the lower temperature characteristics of the battery 10, such that the better the lower temperature characteristics, the higher the lithium deposition tolerance is. Further, the lithium deposition tolerance is defined based on the thermal capacity of the battery 10, such that the larger the thermal capacity, the higher the lithium deposition tolerance is. The index representing a degree of lithium being unlikely to deposit during charge/discharge operation can be applied to a deteriorated battery having a use history.

According to the present embodiment, as shown in FIG. 2, in a deposition tolerance order where the lithium deposition tolerance defined based on a ratio of the negative electrode resistance to the battery resistance is ranked in descending order, the first battery 11 and the seventh battery 17 are ranked first, the second battery 12 and the sixth battery 16 are ranked second, the third battery 13 and the fifth battery 15 are ranked third, and the third battery 13 and the fifth battery 15 are ranked fourth.

The plurality of batteries 10 can be divided, based on deposition tolerance orders, into an upper deposition tolerance group 10A having the deposition tolerance orders higher than the center value of the tolerance order, and a lower deposition tolerance group 10B having the deposition tolerance orders lower than the center value. According to the present embodiment, the number of deposition tolerance orders for the plurality of batteries 10 is four (first, second, third and fourth) as an even number, and the center value is 2.5 calculated as an average value of two values close to the center value. Accordingly, the upper deposition tolerance group 10A includes the first battery 11 and the seventh battery 17 having the first deposition tolerance order, the second battery 12 and the sixth battery 16 having the second deposition tolerance order. On the other hand, the lower deposition tolerance group 10B includes the third battery 13 and the fifth battery 15 having the third deposition tolerance order, the fourth battery 14 having the fourth deposition tolerance order.

As shown in FIG. 1, the plurality of batteries 10 are arranged in the plurality of arrangement portions 20. According to the present embodiment, as the plurality of arrangement portions 20, a first arrangement portion 21, a second arrangement portion 22, a third arrangement portion 23, a fourth arrangement portion 24, a fifth arrangement portion 25, a sixth arrangement portion 26, and a seventh arrangement portion 27 are arranged in this order. An end plate 30 is provided at a portion adjacent to each of the first arrangement portion 21 and the seventh arrangement portion 27 located at both ends of the plurality of arrangement portions 20 in the arrangement direction X. A heat exchanger 50 is disposed below the plurality of arrangement portions 20 in the up-down (vertical) direction Y that orthogonally crosses the arrangement direction X. The heat exchanger 50 is configured to contact the lower ends of the plurality of the battery 10 so as to externally radiate the heat propagated from the plurality of batteries 10.

In the plurality of arrangement portions 20, an amount of heat transfer from respective batteries 10 disposed at corresponding portions varies between arrangement portions 20. For example, an amount of heat transfer from a battery 10 which is located closer to the end portion in the plurality of arrangement portions 20 is likely to be larger. Also, an arrangement portion 20 located close to a member having larger heat capacity than the battery 10, or an arrangement portion thermally coupled to that member, is likely to have larger heat transfer value.

According to the present embodiment, as shown in FIG. 2, the end plate 30 is thermally coupled to the first arrangement portion 21 and the seventh arrangement portion 27 located at the end portions in the arrangement portions 20. Therefore, according to the present embodiment, as shown in FIG. 2, in the heat transfer orders of the plurality of arrangement portions 20 where respective amount of heat transfer from the batteries 10 are ranked in descending order, the first arrangement portion 21 and the seventh arrangement portion 27 is ranked first, the second arrangement portion 22 and the sixth arrangement portion 26 are ranked second, the third arrangement portion 23 and the fifth arrangement portion 25 are ranked third and the fourth arrangement portion 24 is ranked fourth.

The plurality of arrangement portions 20 can be divided, based on the heat transfer order, into an upper heat transfer group 20A having heat transfer orders larger than the center value of the heat transfer order, and a lower heat transfer group 20B having heat transfer orders smaller than the center value of the heat transfer order. According to the present embodiment, the number of the heat transfer orders for the plurality of arrangement portions 20 is four (first, second, third and fourth) as an even number, and the center value is 2.5, calculated as an average value of the two values closest to the center value. Accordingly, the upper heat transfer group 20A includes the first arrangement portion 21 and the seventh arrangement portion 27 having the first heat transfer order, and the second arrangement portion 22 and the sixth arrangement portion 26 having the second transferring order. On the other hand, the lower heat transfer group 20B includes the third arrangement portion 23 and the fifth arrangement portion 25 having the third heat transfer order, and the fourth arrangement portion 24 having the fourth hear arrangement order.

As shown in FIG. 2, the first battery 11 and the seventh battery 17 having the highest lithium deposition tolerance are arranged in the arrangement portion 20 belonging to the upper heat transfer 20A. Further, the battery 10 belonging to the upper deposition tolerance group 10A is disposed in the arrangement portion 20 belonging to the upper heat transfer group 20A, and the battery 10 belonging to the lower deposition tolerance group 10B is disposed in the arrangement portion 20 belonging to the lower heat transfer group 20B. More specifically, according to the present embodiment, the plurality of batteries 10 are arranged in the plurality of arrangement portions 20 such that the deposition tolerance order in the plurality of batteries 10 correspond to the heat transfer order in the plurality of arrangement portions 20.

According to the present embodiment, as shown in FIG. 1, the plurality of arrangement portions 20 are arranged linearly, and the plurality of batteries 10 are mutually stuck as being arranged in the plurality of arrangement portions 20. A pair of end plates 30 are disposed at both end sides of the batteries 11 to 17 in the arrangement direction X. The end plates 30 sandwich the batteries 11 to 17 from both sides in the arrangement direction X. Note that a cushioning member or a heat insulation member may be disposed between adjacent batteries 11 to 17. The cushioning member prevents the battery cells from being directly contacted, and the heat insulation member suppresses heat transfer between the battery cells. Further, according to the present embodiment, an external connection wiring 40 is connected to the battery 10 having the highest lithium deposition tolerance among the plurality of batteries 10. The external connection wiring 40 is connected to a power system of a vehicle which is not shown.

Next, effects and advantages of the battery structure 1 according to the present embodiment will be described in detail. In the battery structure 1 according to the present embodiment, since the arrangement portions 20 belonging to the upper heat transfer group 20A has large heat transfer capability, battery resistance of the batteries 10 arranged in the arrangement portions 20 increases, whereby lithium tends to be deposited. However, according to the battery structure 1 of the present embodiment, since the battery 10 having the highest lithium deposition tolerance in the charging/discharging operation is disposed in the arrangement portion 20 belonging to the upper heat transfer group 20A, lithium deposition is avoided in the entire battery structure 1.

Further, according to the battery structure 1, it is not necessary to provide a heating apparatus that heats the battery 10 in order to prevent lithium to be deposited. Hence, the lithium can be prevented from being deposited, with a simple configuration. Accordingly, the apparatus can be small.

According to the present embodiment, in the case where the plurality of batteries 10 is divided into the upper deposition tolerance group 10A each having upper deposition tolerance order which is higher than the center value of the deposition tolerance order, and the lower deposition tolerance order group 20A each having lower deposition tolerance order which is lower than or equal to the center value of the deposition tolerance order, the batteries 10 belonging to the upper deposition tolerance group 10A are disposed in the arrangement portion 20 belonging to the upper heat transfer group 20A, and the batteries 10 belonging to the lower deposition tolerance group 10B are disposed in the arrangement portion 20 belonging to the lower heat transfer portion group 20B. Thus, since the batteries 10 belonging to the upper deposition tolerance group 10A having high lithium deposition tolerance are disposed in the arrangement portion 20 belonging to the upper heat transfer group 20A, lithium deposition is avoided in the whole battery structure 1.

Also, according to the present embodiment, the lithium deposition tolerance is determined based on at least one of a ratio of the resistance at the negative electrode to the battery resistance of the batteries 10, a capacity ratio between the positive electrode and the negative electrode which is a ratio of the positive electrode capacity to the negative electrode capacity of the batteries 10, low temperature characteristics of the batteries 10, and the thermal capacity of the batteries 10. Thus, the lithium deposition tolerance of the batteries 10 can be obtained with a simple method.

Also, according to the present embodiment, an end plate 30 having a thermal capacity larger than that of the battery 10 is thermally coupled to an arrangement portion 20 where the battery 10 having the highest lithium deposition tolerance is disposed, among the plurality of the arrangement portions 20. Thus, although the heat transfer increases at the arrangement portion 20 to which the end plate 30 is thermally coupled, since the battery 10 having the highest lithium deposition tolerance is disposed in the arrangement portion 20, the increase in the lithium deposition due to the heat transfer can be suppressed.

Moreover, according to the present embodiment, an external connection wiring 40 is connected to the battery 10 having the highest lithium deposition tolerance among the plurality of batteries 10. Although the heat transfer increases due to the external connection wiring 40 in the battery 10 to which the external connection wiring 40 is connected, since the external connection wiring 40 is connected to the battery 10 having the highest lithium deposition tolerance, the increase in the lithium deposition due to the heat transfer can be suppressed.

Figure 3:
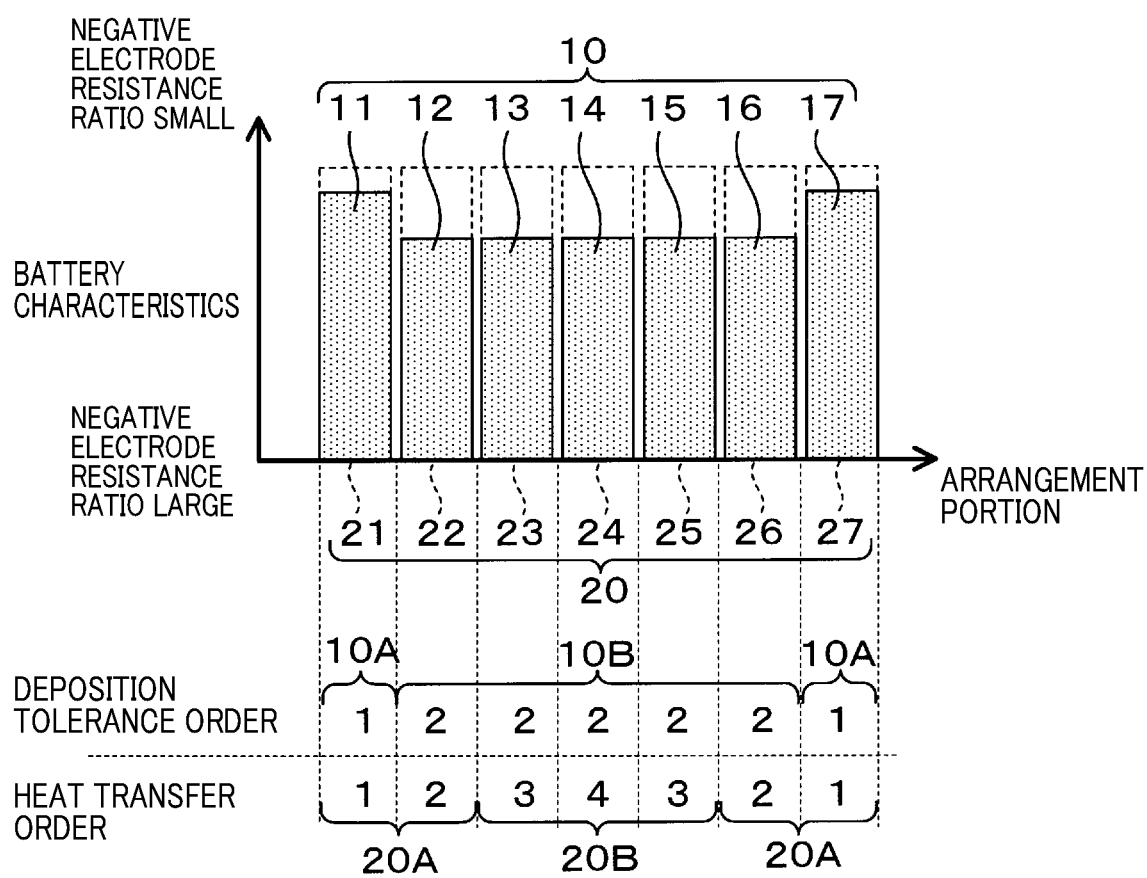
FIG. 3 is a conceptual diagram showing a relationship between a deposition tolerance order and a heat transfer order according to a first modification.

According to the present embodiment, the deposition tolerance order in the plurality of batteries is defined as first to fourth orders. However, as shown in a first modification of FIG. 3, the plurality of batteries 10 may be provided with the first battery 11 and the seventh battery 17 having the highest lithium deposition tolerance and other batteries 12 to 16 having the lowest lithium deposition tolerance, and the deposition tolerance order may be determined as the first and second for that batteries in the plurality of batteries 10. According to the modification, the first battery 11 and the seventh battery 17 belonging to the upper deposition tolerance group 10A are all arranged in the arrangement portion 20 belonging to the upper heat transfer group 20A. However, the second battery 12 and the sixth battery 16 among the plurality of batteries 10 belonging to the lower deposition tolerance group 10B are arranged in the arrangement portion 20 belonging to the upper heat transfer group 20A. According to the present modification, similar effects and advantages can be obtained.

Figure 4:
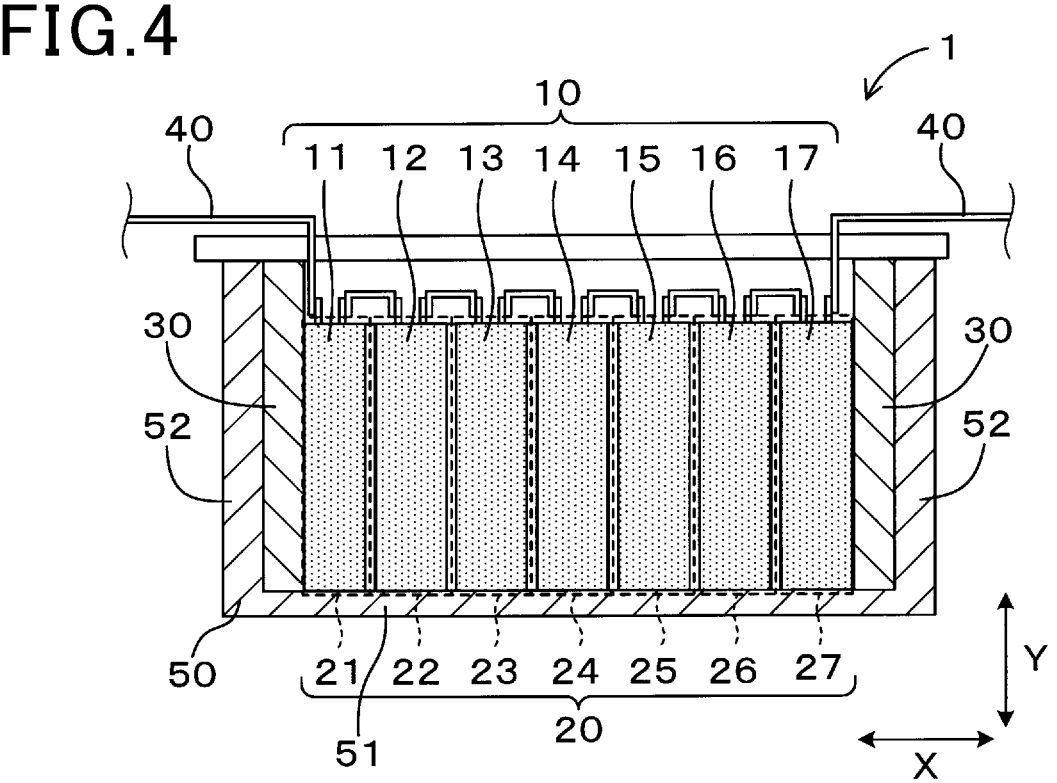
FIG. 4 is a conceptual diagram showing a configuration of a battery structure according to a second modification.

According to the present embodiment, as shown in FIG. 1, the heat exchanger 50 is configured so as to contact the lower surfaces of respective batteries 10. Alternatively, similar to the second modification shown in FIG. 4, the heat exchanger 50 may be provided with a bottom portion 51 being contacted with the lower surfaces of the respective batteries 10 and a pair of standing portions 52 that stands upward from the both ends of the bottom portion 51 in the arrangement direction X. Hence, the heat exchanger has an opening that opens upwards. According to the second modification, the plurality of batteries 10 and the end plates 30 are arranged between the pair of standing portions 52 similar to those in the first embodiment. The pair of standing portions 52 each contact a corresponding end plate 30 at an end in the X direction. According to the second modification, compared to the present embodiment, heat transfer from a battery 10 adjacent to the end plate 30 becomes larger because of the pair of standing portions 52. Even in this case, similar effects and advantages to those in the first embodiment can be obtained.

According to the present embodiment, the plurality of batteries 10 are brand new products where there is no use history. However, the plurality of batteries 10 may include reuse products where there is use history. Since a degree of lithium deposition tolerance as the battery characteristics varies among the reused batteries 10, a variation of the lithium deposition tolerance among the respective batteries 10 including reused batteries tends to be large. Even in this case, reused batteries 10 can be appropriately arranged in the arrangement portions 30 based on the lithium deposition tolerance of the reused batteries 10 and the heat transfer order of the plurality of arrangement portions 20, which contributes to improvement of the utilization of the reused batteries 10.

As described, the present embodiment and the first and second modifications provide the battery structure 1 that prevents lithium from being deposited.

Second Embodiment

Figure 5:
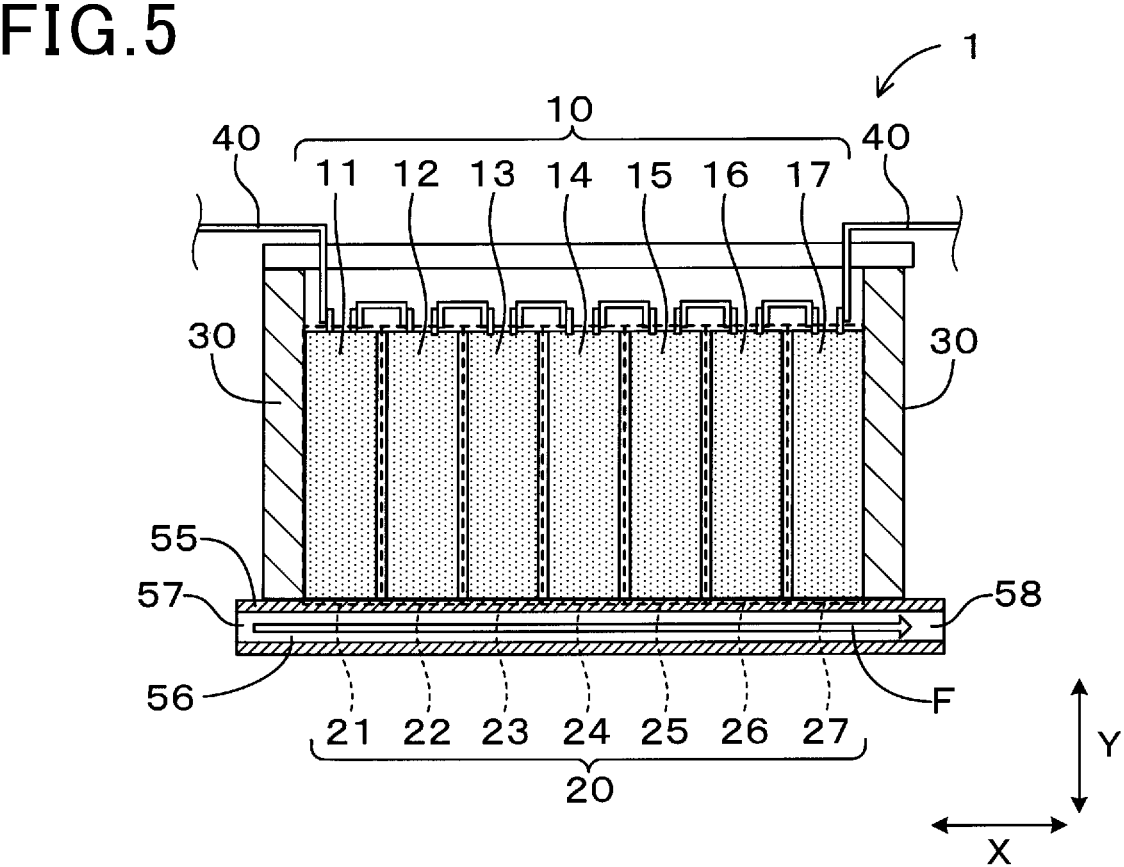
FIG. 5 is a conceptual diagram is a conceptual diagram showing a relationship between a deposition tolerance order and a heat transfer order according to a second embodiment.

As shown in FIG. 5, according to the present embodiment, instead of using the heat exchanger 50 in the first embodiment, a cooling unit 55 as a heat exchanger is provided. Further, each of the plurality of batteries 10 is a reuse product where there is use history, and the battery characteristics in the plurality of batteries 10 varies more than those of the first embodiment.

As shown in FIG. 5, the cooling unit 55 is thermally connected to the bottom surface of the plurality of batteries 10. The cooling unit 55 includes a coolant passage 56, a coolant inlet portion 57 and a coolant outlet portion 58. The coolant passage 56 is configured to allow the coolant to pass therethrough. The coolant inlet portion 57 is configured to introduce the coolant into the coolant passage 56. The coolant outlet portion 58 is configured to exhaust the coolant from the coolant passage 56. As indicated with the arrow F, in the cooling unit 55, the coolant passes through the coolant passage 56 towards the coolant outlet portion 58. The coolant is not limited to a specific type of coolant. However, according to the present embodiment, a liquid coolant is employed.

Figure 6:
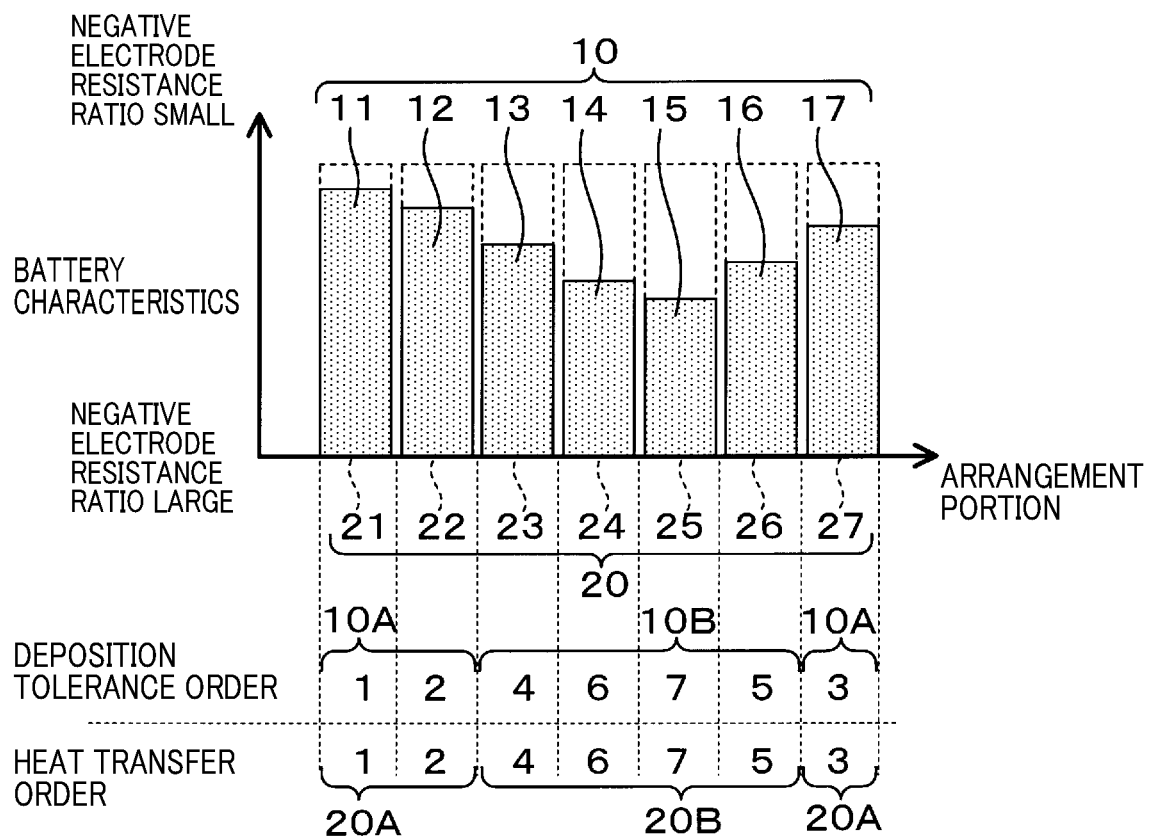
FIG. 6 is a conceptual diagram showing a relationship between a deposition tolerance order and a heat transfer order according to the second embodiment.

According to the present embodiment, as shown in FIG. 5, portions disposed in the arrangement portion 20 which is close to the end plate 30 have large heat adsorption, and portions disposed close to the coolant inlet portion 57 have large heat transfer. Therefore, according to the present embodiment, as shown in FIG. 6, the plurality of arrangement portions 20 are arranged in a descending order of the heat transfer, that is, in the order of the first arrangement portion 21, the second arrangement portion 22, the seventh arrangement portion 27, the third arrangement portion 23, the sixth arrangement portion 26, the fourth arrangement portion 24 and the fifth arrangement portions 25. Accordingly, the first arrangement portion 21, the second arrangement portion 22 and the seventh arrangement portion 27 belong to the upper heat transfer group 20A, and the third arrangement portion 23, the sixth arrangement portion 26, the fourth arrangement portion 24 and the fifth arrangement portion 25 belong to the lower heat transfer group 20B.

According to the present embodiment, the plurality of batteries 10 has, in the descending order of the lithium deposition tolerance, the first battery 11, the second battery 12, the seventh battery 17, the third battery 13, the sixth battery 16, the fourth battery 14 and the fifth battery 15. According to the present embodiment, the deposition tolerance order in the plurality of batteries 10 corresponds to the heat transfer order in the plurality of arrangement portions 20. According to the present embodiment, other elements are the same as those in the first embodiment, where the same reference numbers as those in the first embodiment are applied to the other elements, and the explanation thereof are omitted.

The effects and advantages of the battery structure 1 according to the present embodiment will be described as follows.

The battery structure 1 according to the present embodiment is provided with the cooling unit 55 including the coolant passage 56 allowing the coolant to pass therethrough, the coolant inlet portion 57 that introduces the coolant into the coolant passage 56, and the coolant outlet portion 58 that exhausts the coolant from the coolant passage 56. The first battery 11 having the highest lithium deposition tolerance among the plurality of batteries 10 is disposed in the first arrangement portion 21 which is located at the closest position to the coolant inlet portion 57 among the plurality of arrangement portions 57. Thus, lithium can be prevented from being deposited in the battery structure 1 having the cooling unit 55. In the second embodiment, the same effects and advantages as those in the first embodiment can be obtained.

Figure 7:
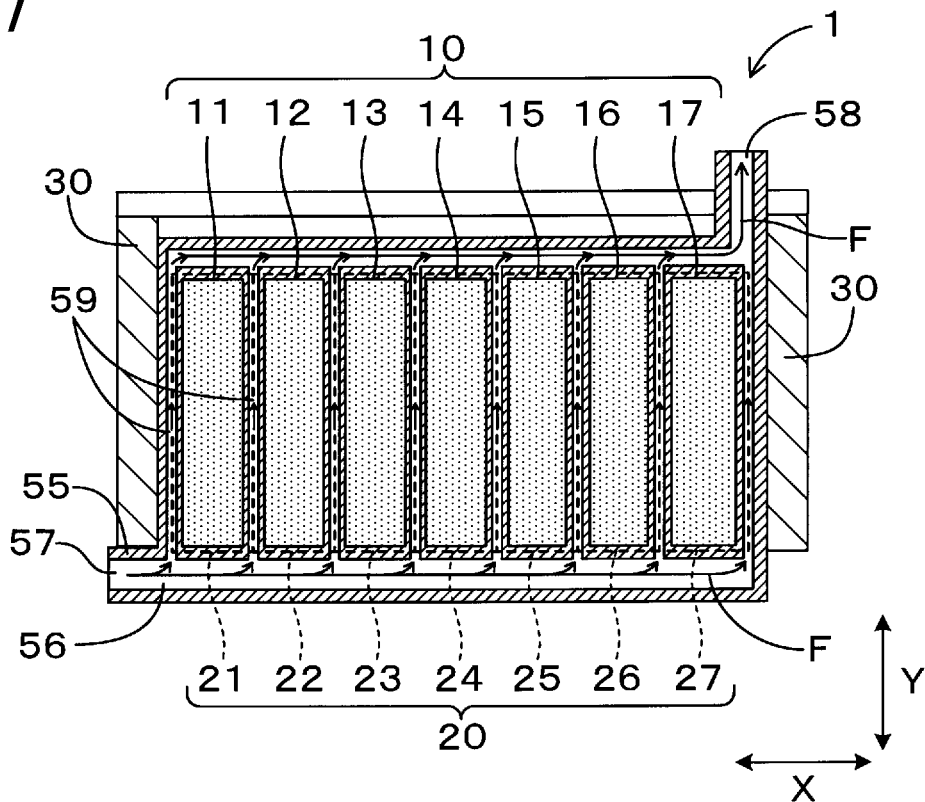
FIG. 7 is a conceptual diagram showing a configuration of a battery structure according to a third modification.

Further, instead of the second embodiment, like the third modification shown in FIG. 7, the cooling unit 55 may be configured as a serpentine type cooling unit having the coolant passage 59 disposed between adjacent batteries 10 and between the end plate 30 and the battery 10. In this case, the cooling capability for the plurality of batteries 10 is enhanced. Even in the third modification, similar effects and advantages to the first and second embodiments can be obtained.

Third Embodiment

Figure 8:
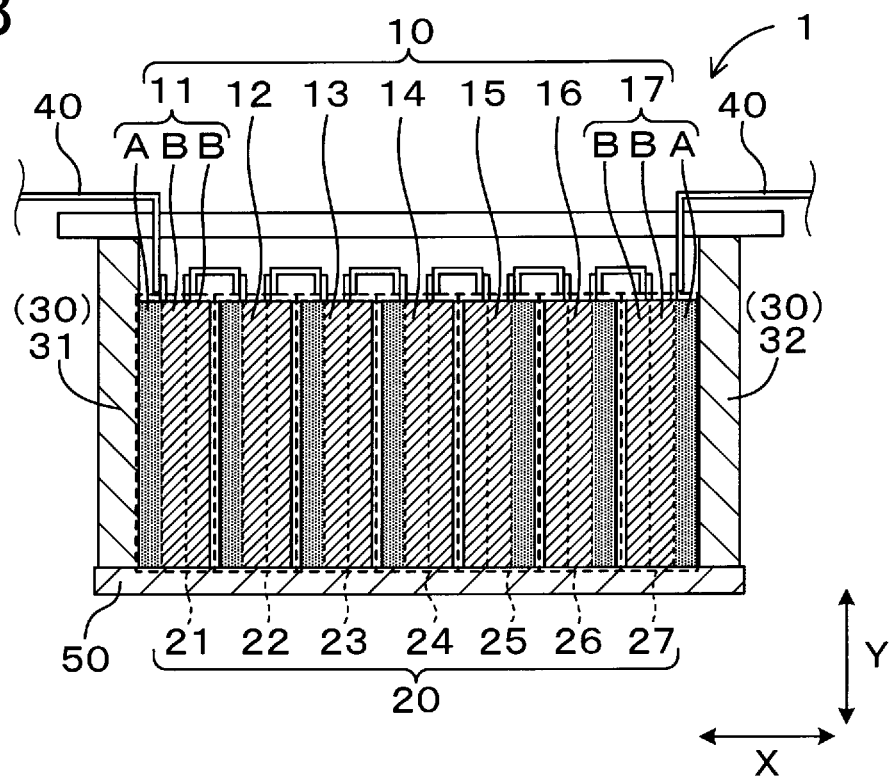
FIG. 8 is a conceptual diagram showing a configuration of a battery structure according to the third embodiment.

According to the third embodiment, instead of the battery 10 composed of single battery, as shown in FIG. 8, each battery of the plurality of batteries 10 has three cells A, B and B which are mutually connected in parallel. Among three cells, the cell A has lower negative electrode resistance ratio than that of the cell B, thus lithium deposition tolerance is higher.

In the plurality of batteries 10, the first battery 11, the second battery 12, the third battery 13 is each disposed at the first arrangement portion 21, the second arrangement portion 22 and the third arrangement portion 23 respectively, which are closer to the first end plate 31 in the pair of end plates 30. For each of the first battery 11 to the third battery 13, cell A having high lithium deposition tolerance is disposed to be close to the first end plate 31. On the other hand, the fifth battery 15, the sixth battery 16 and the seventh battery 17 in the plurality of batteries 10 are disposed at the fifth arrangement portion 25, the sixth arrangement portion 26 and the seventh arrangement portion 27 respectively in the plurality of arrangement portions 20 which are located close to the second end plate 32 as other side end plate in the pair of end plate 30. Moreover, for each of the fifth battery 15 to the seventh battery 17, cell A having the high lithium deposition tolerance is disposed to be close to the second end plate 32. Note that the fourth battery 14 in the plurality of batteries 10 is located to have the same distances to both of the pair of end plates 30. However, according to the present embodiment, the fourth battery 14 is disposed such that the cell A is located to be close to the end plate 31. According to the present embodiment, other elements are the same as those in the first embodiment, where the same reference numbers as those in the first embodiment are applied to the other elements, and the explanation thereof are omitted.

According to the present embodiment, each of the plurality of batteries 10 is disposed such that the cell A having high lithium deposition tolerance is located to be close to the end plate 30. Thus, even for each battery 10, since the cell A having high lithium tolerance is located at a portion having high heat transfer, lithium can be prevented from being deposited in the respective batteries 10.

The present disclosure is not limited to the above-described embodiments and the modifications, and can be applied to various embodiments without departing the scope of the present disclosure. For example, instead of the heat exchanger 50 in the third embodiment, a configuration of the cooling unit 55 in the second embodiment can be employed.

CONCLUSION

As described, the present disclosure provides a battery structure including: a plurality of batteries (10) each made of lithium-ion secondary battery; and a plurality of arrangement portions (20) in which the plurality of batteries are arranged.

The plurality of arrangement portions are divided into two groups: a upper heat transfer group (20A) having heat transfer orders higher than a center value of the heat transfer orders, where the heat transfer orders are respective amount of heat transfer from the batteries being ranked in descending order; and a lower heat transfer group (20B) having the heat transfer orders lower than the center value.

A battery among the plurality of batteries showing the highest value of a lithium deposition tolerance which represents a degree of lithium being unlikely to deposit during charge/discharge operation, is disposed in a high tolerance arrangement portion in the plurality of arrangement portions, the high tolerance arrangement portion belonging to the upper heat transfer group.

According to the above-described battery structure, in the arrangement portions belonging to the upper heat transfer group, since the heat transfer is large, an electrical resistance of each battery arranged in that arrangement portions increases in response to a decrease in the temperature, whereby the lithium deposition tends to be accelerated. However, in the battery structure, since the battery having the highest lithium deposition tolerance in the charge/discharge operation is disposed in the arrangement portion belonging to the upper heat transfer group, lithium deposition is avoided in the whole battery structure. As a result, according to the present disclosure, a battery structure that avoids lithium deposition can be provided.

What is claimed is:

1. A battery structure comprising:
   a plurality of batteries each made of lithium-ion secondary battery; and
   a plurality of arrangement portions in which the plurality of batteries are arranged,
   wherein
   the plurality of arrangement portions are divided into two groups of:
      an upper heat transfer group having heat transfer orders higher than a center value of the heat transfer orders, where the heat transfer orders are respective amounts of heat transfer from the batteries being ranked in descending order, and
      a lower heat transfer group having heat transfer orders lower than the center value; and
   a battery among the plurality of batteries showing the highest value of a lithium deposition tolerance which represents a degree of lithium being unlikely to deposit during charge/discharge operation, is disposed in a high tolerance arrangement portion in the plurality of arrangement portions, the high tolerance arrangement portion belonging to the upper heat transfer group.

2. The battery structure according to claim 1, wherein
   the plurality of batteries are divided into two groups of:
      a upper deposition tolerance group having deposition tolerance orders higher than a center value of the deposition tolerance order, where the deposition tolerance orders are lithium deposition tolerance being ranked in the descending order for the plurality of batteries, and
      a lower deposition tolerance group having the deposition tolerance orders lower than the center value; and
   each of the batteries belonging to the upper deposition tolerance group is arranged in the high tolerance arrangement portion, and each of the batteries belonging to lower deposition tolerance group is arranged in a low tolerance arrangement portion belonging to the lower heat transfer group.

3. The battery structure according to claim 1, wherein
   the lithium deposition tolerance is defined based on at least one of a ratio of a negative electrode resistance to a battery resistance of each of the plurality of batteries, a ratio of the positive electrode capacity to a negative electrode capacity for each of the plurality of batteries, low temperature characteristics of each of the plurality of batteries, and a thermal capacity of each of the plurality of batteries.

4. The battery structure according to claim 1, wherein
   a member having a thermal capacity which is larger than that of respective batteries is thermally coupled to the high tolerance arrangement portion in the plurality of arrangement portions.

5. The battery structure according to claim 1, wherein
   an external connection wiring is connected to the battery having the highest lithium deposition tolerance among the plurality of batteries.

6. The battery structure according to claim 1 further comprising a cooling unit having a cooling passage that allows coolant to pass therethrough, a coolant inlet portion that introduces the coolant into the coolant passage, and a coolant outlet portion that exhausts the coolant from the coolant passage, the coolant passage is configured to allow the coolant to pass through the cooling passage, thereby cooling the plurality of batteries; and the battery having the highest lithium deposition tolerance among the plurality of batteries is disposed in an arrangement portion located closest to the coolant inlet portion in the plurality of arrangement portions.

7. The battery structure according to claim 1, wherein the plurality of batteries include reuse products where there is use history.

* * * * *